United States Patent [19]
Sakata

[11] Patent Number: 5,836,589
[45] Date of Patent: Nov. 17, 1998

[54] SLIDING MEMBER FOR USE WITH LIGHTWEIGHT METAL

[75] Inventor: Tatsuei Sakata, Kashiwazaki, Japan

[73] Assignee: Kabushiki Kaisha Riken, Tokyo, Japan

[21] Appl. No.: 903,495

[22] Filed: Jul. 30, 1997

[30] Foreign Application Priority Data

Aug. 12, 1996 [JP] Japan .................................... 8-227332

[51] Int. Cl.⁶ ...................................................... F16J 9/28
[52] U.S. Cl. .......................... 277/407; 277/496; 277/944; 277/938; 277/936; 428/34.5; 428/35.7; 428/328
[58] Field of Search ..................................... 277/407, 496, 277/500, 358, 944, 938, 941; 428/34.5, 35.7, 325, 328, 408

[56] References Cited

U.S. PATENT DOCUMENTS

| | | | |
|---|---|---|---|
| 4,723,350 | 2/1988 | Kobayashi et al. | 277/924 X |
| 4,753,444 | 6/1988 | Jackson et al. | 277/944 X |
| 4,986,511 | 1/1991 | Irby et al. | 277/944 X |
| 5,011,879 | 4/1991 | Uesaka et al. | |
| 5,240,769 | 8/1993 | Ueda et al. | 277/538 X |
| 5,695,197 | 12/1997 | Farley et al. | 277/938 X |
| 5,707,716 | 1/1998 | Yoshino et al. | |

FOREIGN PATENT DOCUMENTS

| | | | |
|---|---|---|---|
| 118772 | 9/1984 | European Pat. Off. | 277/499 |
| 59-359229035 | 12/1984 | Japan | 277/499 |
| 5-262976 A | 10/1993 | Japan . | |

Primary Examiner—Jose V. Chen
Assistant Examiner—Hanh V. Tran
Attorney, Agent, or Firm—Kubovcik & Kubovcik

[57] ABSTRACT

A sliding member used as a sealing ring for a rotary shaft made of a lightweight aluminum alloy in an automatic transmission instead of a conventional cast iron sealing ring in order to prevent leakage of oil and reduce abrasion of the shaft consists of a PEEK resin composition which includes, as binder, 15~20 percent by weight of amorphous alumina powder having an average particle diameter of $5\mu$ or less, 3~8 percent by weight of graphite powder having an average particle diameter of $5\mu$ or less and 6~9 percent by weight of carbon powder having an average particle diameter of $30\mu$ or less.

5 Claims, 7 Drawing Sheets

SLIDING MEMBER FOR USE WITH LIGHTWEIGHT METAL

BACKGROUND OF THE INVENTION

This invention relates to a sliding member consisting of a polyetheretherketone containing a binder therein and exhibiting an excellent sliding characteristic that will not cause a lightweight metal alloy to be damaged.

A sealing member such as a sealing ring is used in the automobile industry to prevent the leakage of oil in automatic transmissions. Meanwhile, in order to reduce the weight of automobiles, attempts have been made to use lightweight metals, such as aluminum alloys (e.g. ADC-12Z (1.5~3.5 wt % Cu, 10.5~12.0 wt % Si, 0.30 wt % or less Mg, 1.0 wt % or less Zn, 1.3 wt % or less Fe, 0.5 wt % or less Mn, 0.5 wt % or less Ni, 0.3 wt % or less Sn, and balance Al for die casting), in accordance with the Japanese Industrial Standards), to fabricate most of the components that constitute these transmissions. As a result, the members slidingly contacted by the sealing rings are in most instances composed of lightweight metal materials. If a sealing ring consists of steel, the lightweight metal member which it contacts sustains a high degree of abrasion owing to friction. On the other hand, if the sealing ring consists of soft metal, the sliding surface of the sealing ring sustains excessive abrasion. Though a sealing ring fitted on the rotary shaft of an automatic transmission using ADC-10 or ADC-12 as the aluminum alloy is made of cast iron conforming to JIS FC250, oil leakage on the order of 500~1000 cc/min is experienced under a pressure of 1 MPa (about 10 kgf/cm$^2$).

Owing to their merits such as abrasion resistance and resistance to cohesion, cast iron rings have come to be used despite the disadvantage of oil leakage mentioned above. However, as oil pumps become increasingly smaller in size in the effort to make automatic transmissions of lighter weight, it will no longer be possible to use cast iron rings because of the large amount of oil leakage they allow.

Though sealing rings made of synthetic resin have been proposed as a solution, the problem that arises in this case is abnormal wear sustained by the aluminum alloy member in sliding contact with such a sealing ring. Sealing rings that have been proposed in order to eliminate this drawback include sealing rings made of polytetrafluoroethylene (PTFE), sealing rings made of polyetheretherketone (PEEK) filled with carbon fibers and PTFE, and sealing rings comprising PEEK, carbon fibers, PTFE and sericite (see Japanese Patent Laid-Open Publication No. Hei 5-262976). However, it has become clear that even these sealing rings are not suited to members consisting of lightweight metal such as aluminum alloy because of the great wear sustained by such members.

SUMMARY OF THE INVENTION

Accordingly, an object of the present invention is to provide a novel sliding member, used in place of the conventionally employed cast iron sealing rings and synthetic resin sealing rings, wherein the novel sliding member does not allow leakage of oil and does not cause wear on the lightweight metal member it contacts.

According to the present invention, the foregoing object is attained by providing a sliding member comprising a polyetheretherketone resin which includes, as binder, 15~20 percent by weight of amorphous alumina powder having an average particle diameter of 5$\mu$ or less, 3~8 percent by weight of graphite powder having an average particle diameter of 5$\mu$ or less and 6~9 percent by weight of carbon powder having an average particle diameter of 30$\mu$ or less.

Preferably, 15 wt % of amorphous alumina powder, 3 wt % of graphite powder and 6~9 wt % of porous carbon powder are contained in a base material of polyethereetherketone as binder.

Owing to its non-viscosity, use of the conventionally employed PTFE as a base to which a filler is added has been considered. However, it has been found that since PTFE as a base material softens with a rise in temperature, the filler is lost and a shaft made of aluminum alloy is attacked owing to the formation of protrusions. Accordingly, PEEK has been selected as the resin since it exhibits little softening of the base resin at high temperatures. In addition, finely divided powders have been selected as the filler. The reason for selecting the finely divided powders is as follows: A hard filler cannot provide a first sliding surface owing to waviness (the irregular shape) of a sliding surface caused by softening of the base material. Furthermore, it was attempted to improve the properties of the sliding surface by covering and concealing the sliding surface in the finely divided powders in such a manner that the base resin will not appear at the surface, and adopting this as a surface layer of the kind that might be obtained by providing the resin material with a plating layer.

The filler of finely divided powders was obtained as follows: Amorphous alumina having an average particle diameter of 5$\mu$ or less was adopted as a first filler. The reason for this is that X-ray diffractometry shows that this powder exhibits incomplete transition to α alumina. It is believed that α alumina acts as a hard, indestructible filler at the sliding surface, thereby damaging the contacting aluminum alloy, namely the shaft member made of ADC. A second filler consisting of graphite also having an average particle diameter of 5$\mu$ or less was selected to compensate for the inadequate lubricating property of the alumina. Carbon was selected as a third filler.

Since both the alumina and graphite are finely divided powders, they exhibit little oil retention. If these were used in a sealing ring for an automatic transmission, it is believed that they alone would not provide lubrication of the sliding surface. Therefore, in order to arrange it so that the aluminum alloy, by loss of oil film, carbon powder having an average particle diameter of 30$\mu$ or less and possessing minute voids was selected as one of the fillers.

These three fillers were mixed together while varying the blending proportions in the manner shown in Table 1, and pellets were formed by a twin-screw extruder. The fillers used were amorphous alumina powder (average particle diameter: 0.7$\mu$, manufactured by Japan Light Metals), graphite powder (average particle diameter: 1.0$\mu$, manufactured by SEC K.K.) and carbon powder (average particle diameter: 30$\mu$, manufactured by Nippon Carbon Co., Ltd.). The resin used as the base material was Victrex Peek (PEEK) manufactured by ICI K.K. As shown in Table 1, test materials (A~I) were fabricated using the following blending proportions, which are based upon the amount of graphite: alumina: 15~25%; carbon: 6~12%; remainder: PEEK resin.

TABLE 1

| | ALUMINA | CARBON | GRAPHITE | PEEK |
|---|---|---|---|---|
| | | | (wt.- %) | |
| A | 25 | 6 | 3 | 66 |
| B | 25 | 9 | 3 | 63 |

TABLE 1-continued

|   | ALUMINA | CARBON | GRAPHITE | PEEK |
|---|---------|--------|----------|------|
|   | (wt.- %) | | | |
| C | 25 | 12 | 3 | 60 |
| D | 20 | 6  | 3 | 71 |
| E | 20 | 9  | 3 | 68 |
| F | 20 | 12 | 3 | 65 |
| G | 15 | 6  | 3 | 76 |
| H | 15 | 6  | 3 | 73 |
| I | 15 | 12 | 3 | 70 |

DESCRIPTION OF THE PREFERRED EMBODIMENTS

An embodiment of the present invention will now be described in detail.

Figure 1:
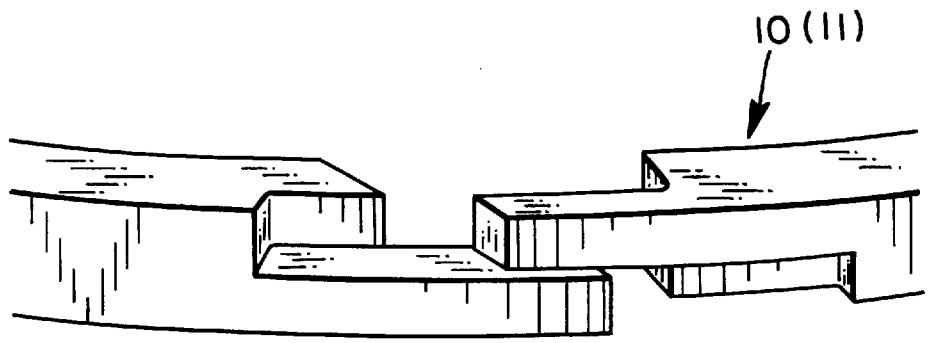
FIG. 1 is a partial perspective view showing a sealing ring having a special ring gap (of double-step type)

The test materials A~I shown in Table 1 were kneaded by a two-screw extruder. The kneading conditions were a heater temperature of 400° C., a screw rotating speed of 50 rpm and a powder feeder rotating speed of 65 rpm. Approximately 3 mm of the extruded kneaded material was placed in an automatic cutter to form pellets having lengths of about 3~4 m/m. Furthermore, test pieces for narrowing down the range of suitable compositions were fabricated in a test in which pellets were subjected to an abrasion correlation test with regard to ADC-12 under conditions of a molding pressure of 130 MPa, a nozzle temperature of 400° C., a mold temperature of 170° C. and an extrusion rate of 60%. The test pieces were fabricated to have a ring shape so that they could subsequently be subjected to evaluation as rotary shaft sealing rings in an actual machine. One of the rings shown is shown at 10 (11) in FIG. 1. The ring has a special ring gap (of double-step type) and an outer diameter of 59 mm, an inner diameter of 54.4 mm and a thickness of 2.4 mm. By using PEEK as the base material, machining that could not readily be performed on the conventional cast iron ring can be achieved by molding to obtain the double-step ring gap. By providing the ring gap with a complicated structure, minimal oil leakage can be assured over a wide range of oil temperatures.

Figure 2:
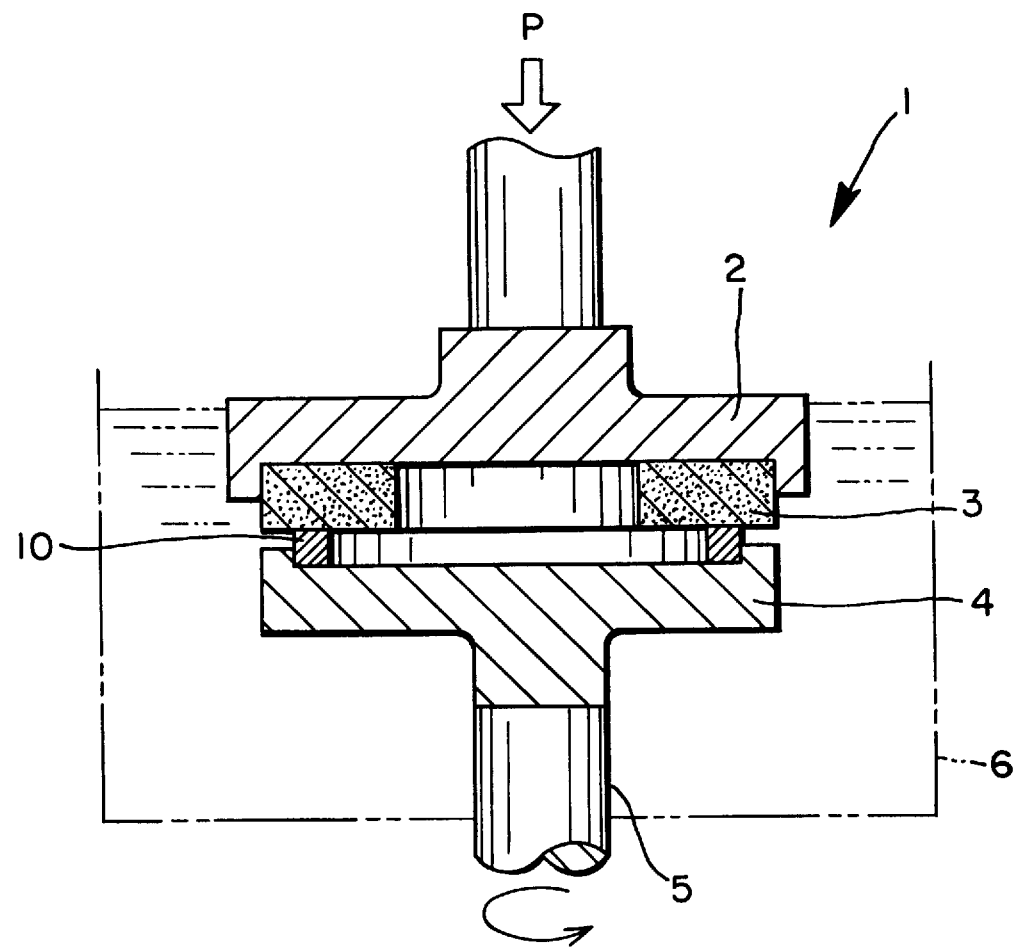
FIG. 2 is a diagram showing the principal components of a Matsubara-type abrasion tester utilized to narrow down the compositions according to the present invention.

An abrasion test described below was performed to narrow down the ideal composition proportions shown in Table 1. FIG. 2 is a sectional view showing the principal components of an abrasion tester 1. The tester has a holder 2 on which a disk 3 (having a diameter of 80 mm and a thickness of 10 mm) made of aluminum alloy (ADC-12Z) is supported in a freely detachable manner. A holder 4 for a test piece is connected to a rotary shaft 5 and is capable of being rotated freely with respect to the disk holder 2. The above-mentioned sealing ring 10 serving as the test piece is secured in the test-piece holder 4 and is brought into sliding contact with the disk 3. The holder 2 is subjected to an axially directed pressure P so that pressured contact is produced between the disk 3 and the sealing ring 10. At least the disk 3 and the sealing ring 10 are immersed in ATF lubricating oil 6. The abrasion test conditions are illustrated in Table 2.

TABLE 2

| TESTER USED | MATSUBARA ABRASION TESTER |
|---|---|
| FRICTIONAL MODE | ATF LUBRICATED SLIDING; OIL TEMPERATURE UNREGULATED |
| FRICTIONAL DISTANCE | 44 km |
| FRICTIONAL SPEED | 6.1 m/s |
| CONTACT SURFACE PRESSURE | 1 Mpa (PRESSURIZING LOAD: 40 kg) |

Figure 3:
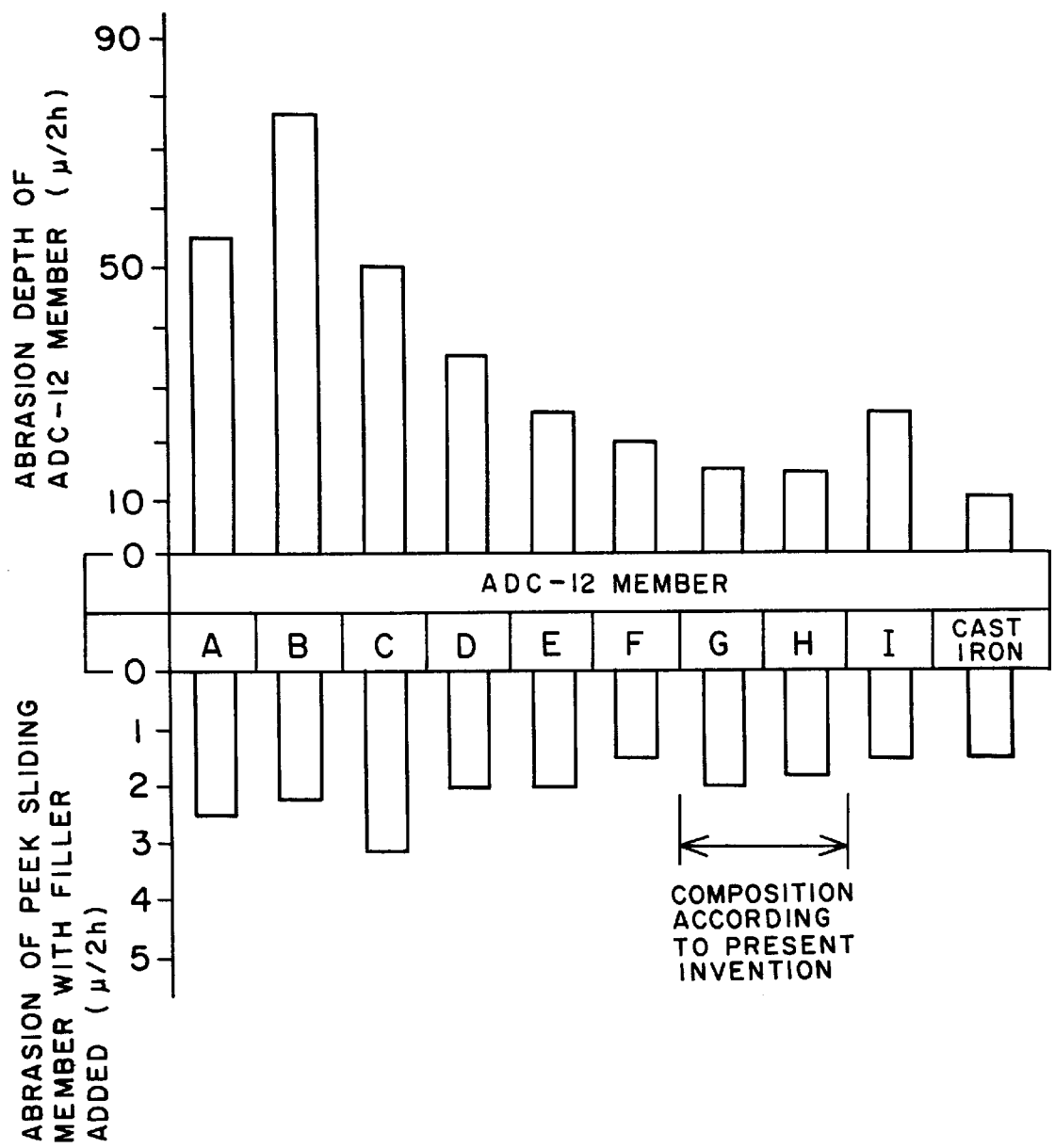
FIG. 3 is a diagram showing the results of an abrasion correlation test carried out to determine the compositions of the present invention.
Figure 4:
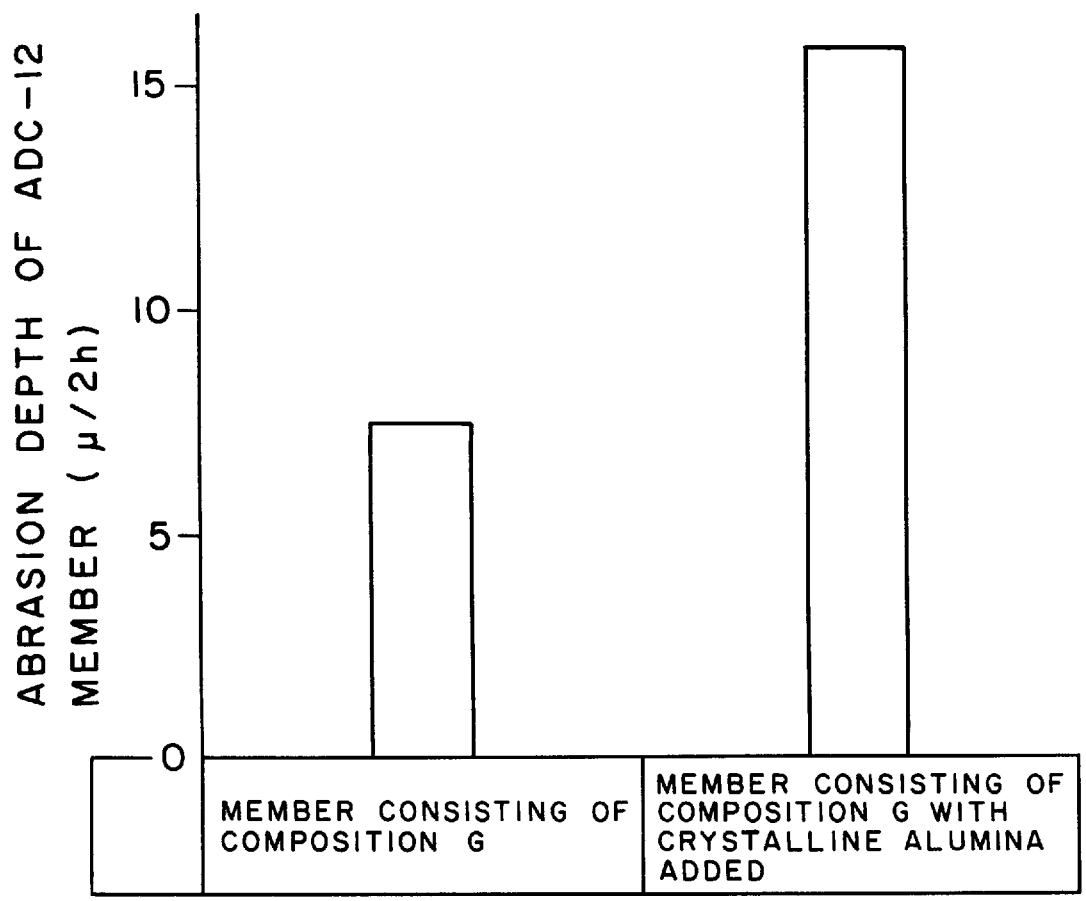
FIG. 4 is a diagram showing the degree to which a member of ADC-12 is affected in terms of abrasion owing to a difference between amorphous alumina and crystalline alumina in a composition G among the compositions of the present invention.
Figure 5:
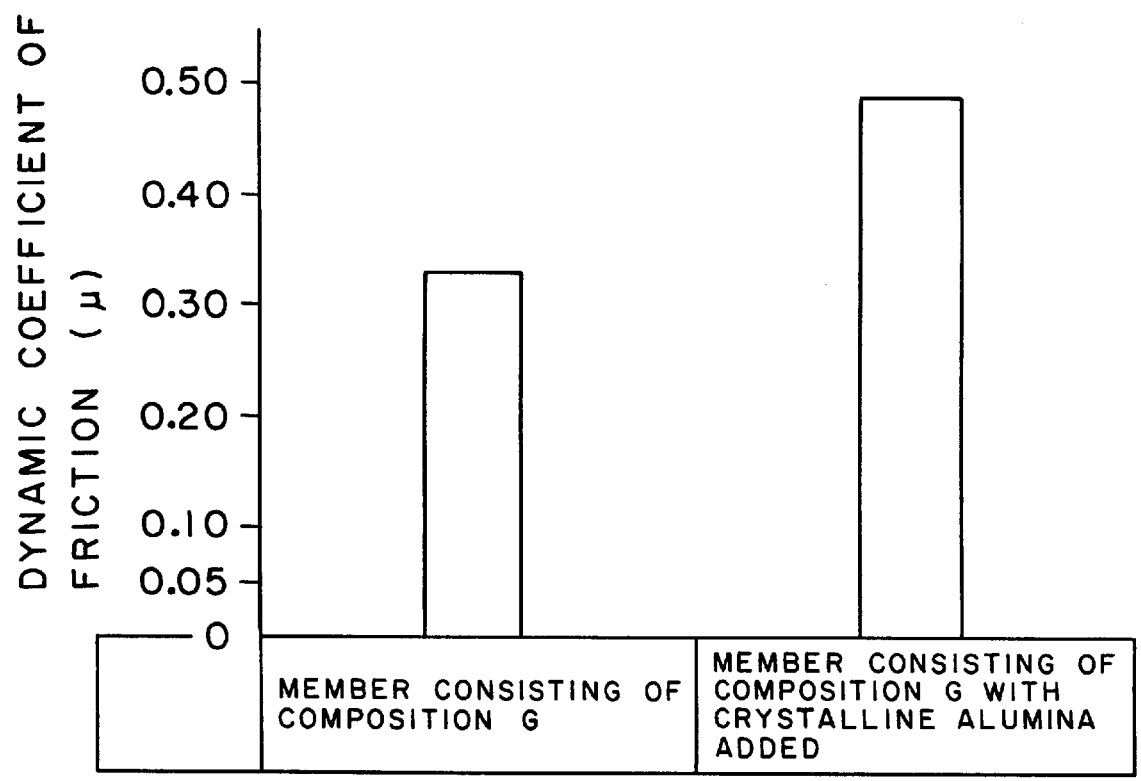
FIG. 5 is a diagram showing the degree to which a member of ADC-12 is affected in terms of coefficient of friction owing to a difference between amorphous alumina and crystalline alumina in composition G among the compositions of the present invention.

FIG. 3 illustrates the results of the abrasion test. It was found that the compositions G, H are equivalent to cast iron in terms of excellent abrasion correlation with regard to ADC-12. More specifically, the ideal compositions were alumina powder: 15%; graphite: 3%; carbon powder: 6~9%; remainder: PEEK 73~76%. Further, in order to judge the effects of amorphous alumina, an abrasion correlation test was conducted on the composition G under the conditions shown in Table 2 using crystalline alumina having a particle size of not more than $1\mu$. The results are shown in FIG. 4. It was found that adding the crystalline alumina increased the abrasion of the ADC-12 and that the dynamic coefficient of friction also rose by 30%, as shown in FIG. 5. Thus it was confirmed that a ring-shaped test piece having the composition of the present invention was effective in terms of sealability, self-abrasion and abrasion of a rotary shaft made of ADC-12 when used as an actual sealing ring and compared with the conventional ring made of cast iron.

Figure 6:
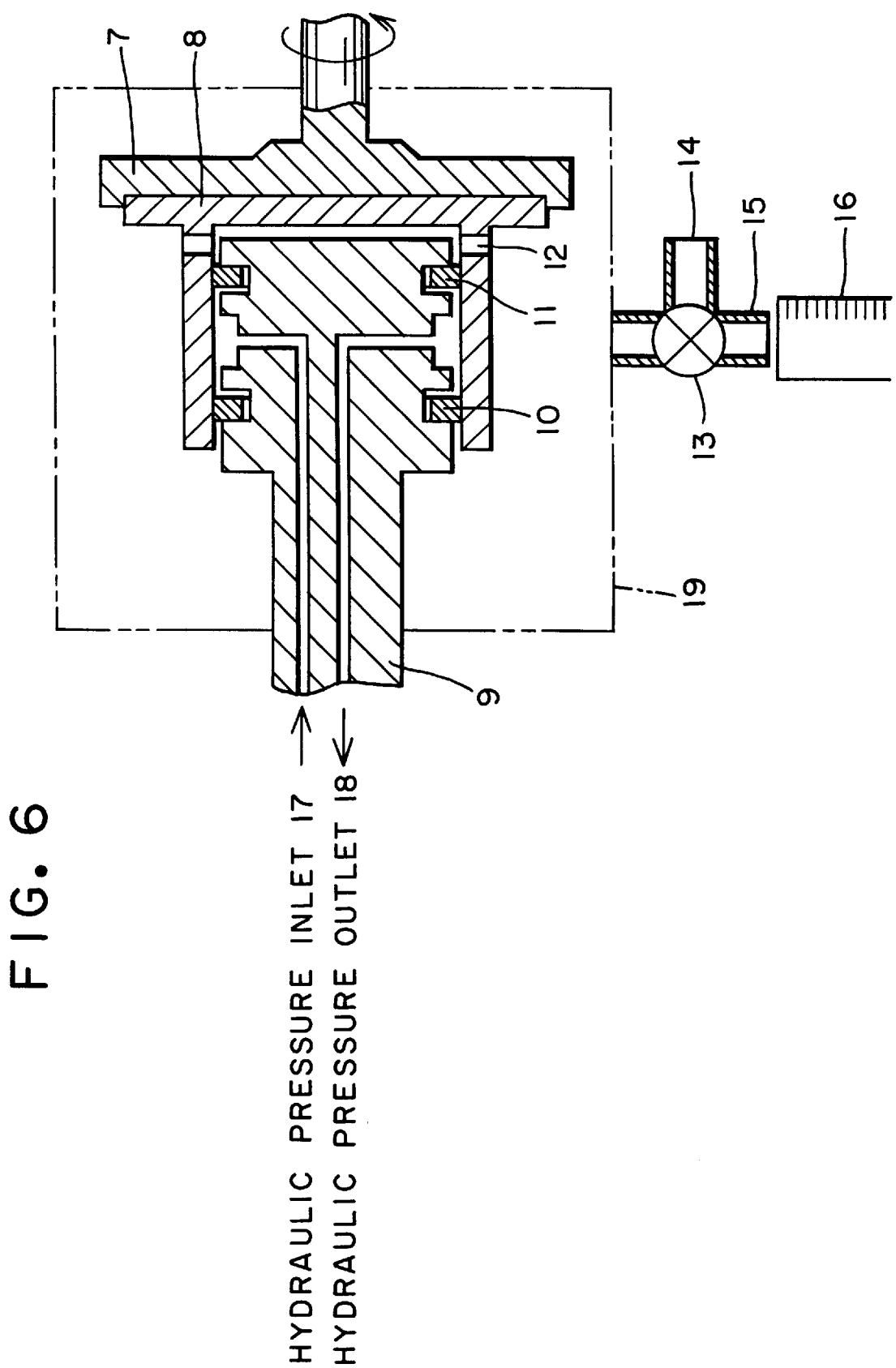
FIG. 6 is a sectional view showing the principal components of a test machine used to test the performance of a sealing ring using the material of the present invention and the performance of a sealing ring according to the prior art.

A rotating sealing ring was tested under the conditions shown in Table 3 using the tester shown in FIG. 6.

The tester illustrated in FIG. 6 has a cylinder 8 secured to a rotating holder 7 and comprising JIS S35C. The end of a shaft 9 comprising an aluminum alloy (ADC-12Z) is inserted into the hollow portion of the cylinder 8. The sealing rings 10, 11 fabricated in accordance with the present invention are fitted into ring grooves formed in the outer periphery of the shaft 9, which has hydraulic passageways 17, 18 for supplying oil to and discharging oil from the sealing rings 10, 11. A drain hole 12 provided in the shaft 9 is for feeding oil, which has leaked from the sealing ring 11, into graduated cylinder 16. Also provided are a three-way valve 13 and discharge pipes 14, 15. A case 19 introduces any oil that has leaked into the graduated cylinder 16.

The outer circumferential surfaces of the sealing rings 10, 11 are in intimate contact with the inner circumferential surface of the cylinder 8, and the side surfaces of the sealing rings 10, 11 are in sliding contact with the side surfaces of the ring grooves of shaft 9. Oil supplied from the hydraulic passageways 17, 18 acts upon the inner circumferential surfaces of the sealing rings 10, 11 and upon one side face thereof. The other side face of each of the sealing rings 10, 11 is pressed against the corresponding ring groove. The sealing rings 10, 11 tested were those according to the present invention and those according to the prior art.

TABLE 3

| CYLINDER ROTATING SPEED | 6000 rpm |
|---|---|
| HYDRAULIC PRESSURE | 1 Mpa |
| ATF TEMPERATURE | 120~130° C. |
| LENGTH OF TEST | 100 hrs CONTINUOUSLY |

Figure 7:
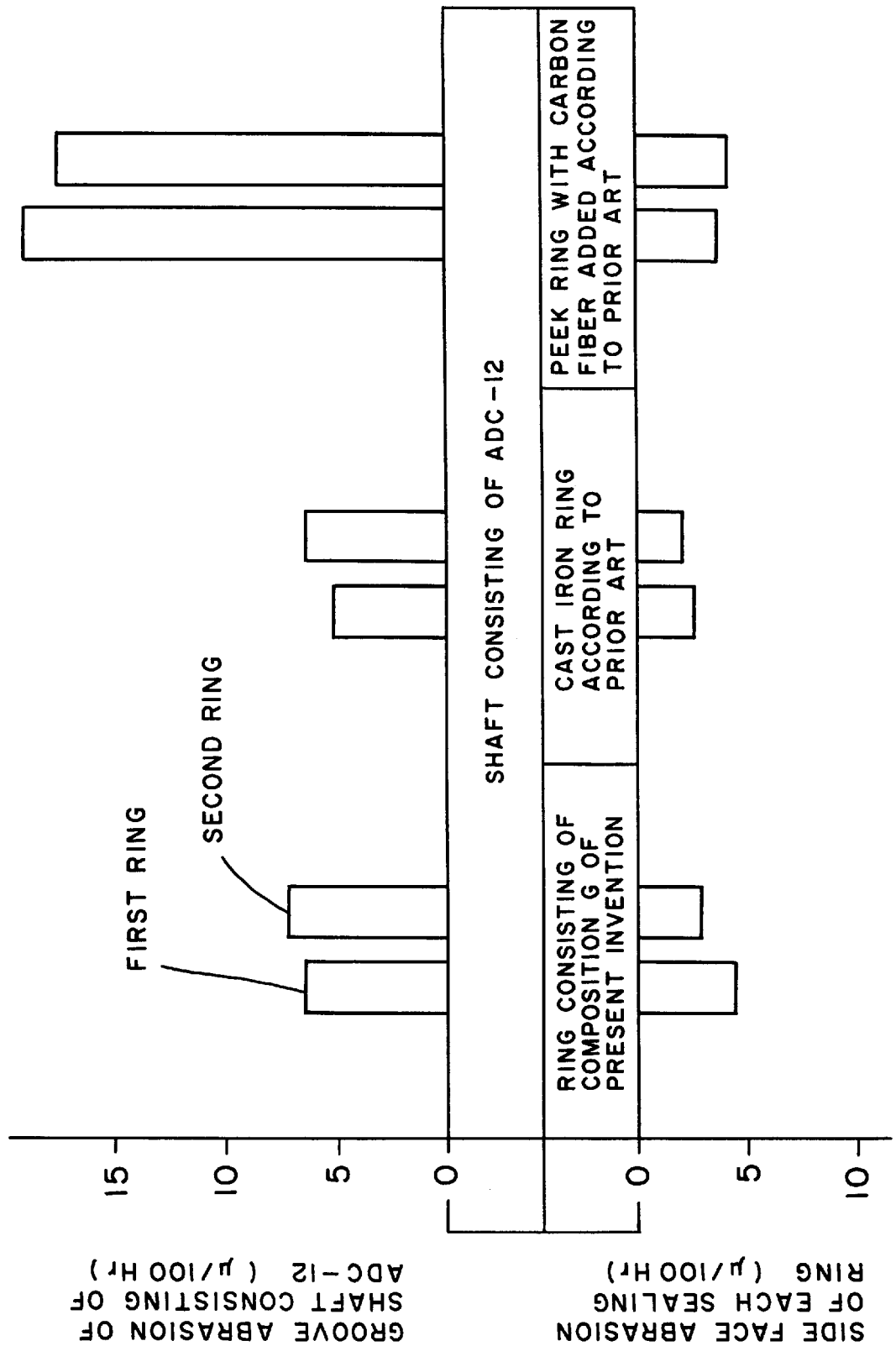
FIG. 7 is a diagram showing the results obtained by comparing the performances of a sealing ring using the material of the present invention and the performances of a sealing rings according to the prior art.
Figure 8:
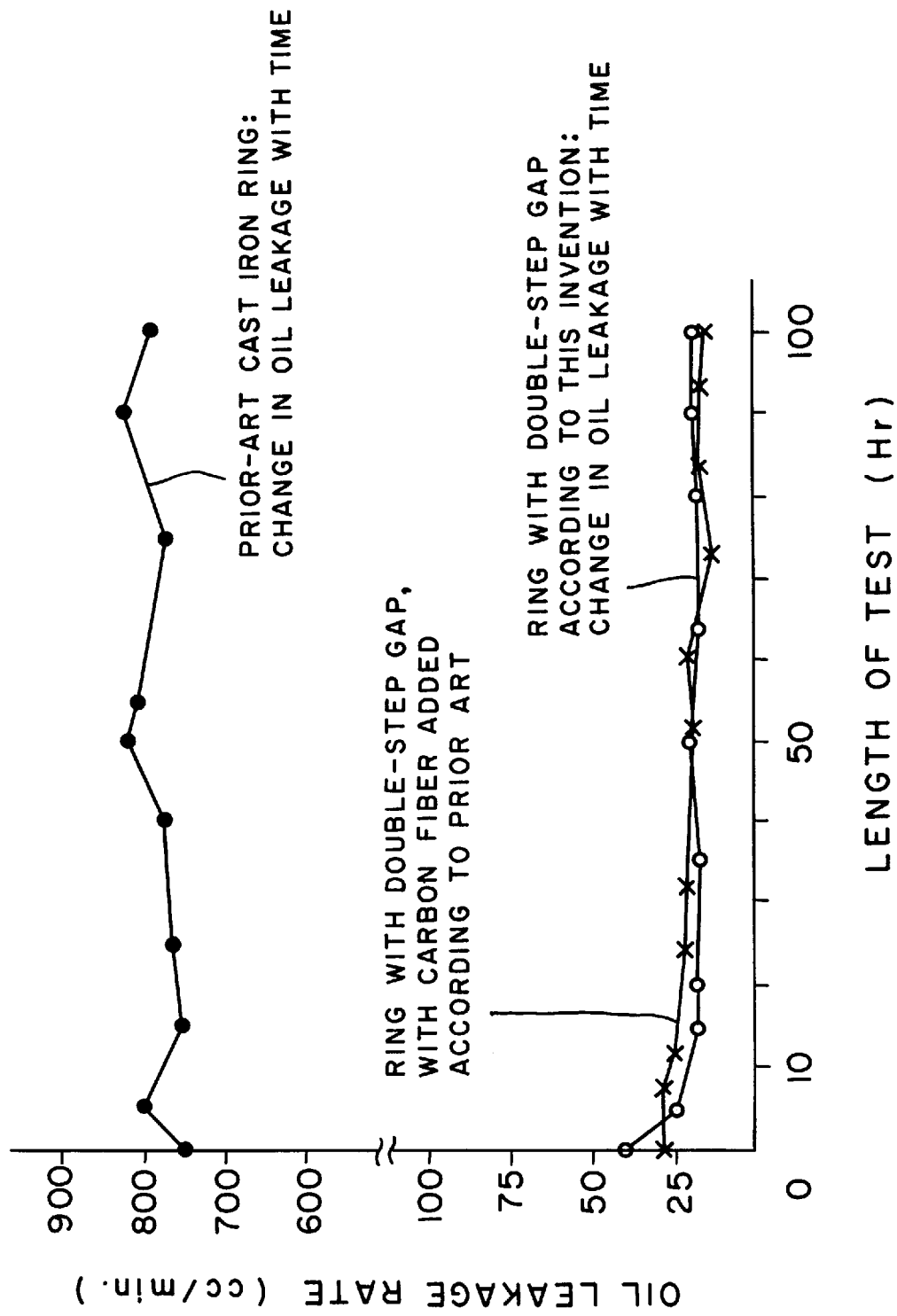
FIG. 8 is a diagram showing the results obtained by comparing the performances of a sealing ring using the material of the present invention and the performances of a sealing rings according to the prior art.

FIG. 7 is a diagram showing the abrasion correlation between a ring groove machined in the shaft 9 made of ADC-12 widely used in automatic transmissions and the sealing rings 10, 11 after testing side-face abrasion of the sealing rings for 100 hrs. It was found that the sealing rings having the composition according to the present invention match the widely used conventional cast iron rings in terms of abrasion of the grooves in the shaft of ADC-12 and that they do much less damage to the grooves of the shaft of ADC-12 in comparison with conventional PEEK resin rings strengthened with carbon fiber. With regard to oil sealability, which is the property of prime importance, it was found that the seal rings of the present invention reduce oil leakage to a low level (1/30 of that conventionally) not achievable with the prior art while not subjecting the grooves of the shaft of ADC-12 to wear, as illustrated in FIG. 8. Thus it was found that the present invention is highly practical and contributes greatly to a reduction in weight and an improvement in fuel consumption demanded by automobiles of the future. Further, the filler composition can be applied also to a sliding member the basic material of which is PEN (polyethernitrile) resin, the molecular structure of which resembles that of PEEK resin.

Thus, by using a resin ring exhibiting excellent flexibility in place of a cast iron ring as the sealing ring of a rotary shaft, leakage of oil is prevented, abrasion of a shaft made of ADC can be reduced and it is possible to achieve a weight reduction by using aluminum alloy in the automatic transmission of automobiles.

As many apparently widely different embodiments of the present invention can be made without departing from the spirit and scope thereof, it is to be understood that the invention is not limited to the specific embodiments thereof except as defined in the appended claims.

What is claimed is:

1. A sliding member for sliding contact with a lightweight metal alloy, comprising polyetheretherketone resin and a binder having 15~20 percent by weight of amorphous alumina powder 3~8 percent by weight of graphite powder, and 6~9 percent by weight of carbon powder.

2. A sliding member according to claim 1, wherein amorphous alumina powder has an average particle diameter of $5\mu$ or less, graphite powder has an average particle diameter of $5\mu$ or less, and carbon powder has an average particle diameter of $30\mu$ or less.

3. A sliding member according to claim 2, wherein carbon powder is porous.

4. A sliding member for sliding contact with an aluminum based metal alloy, consisting essentially of polyetheretherketone resin and a binder having 15 percent by weight of amorphous alumina powder having an average particle diameter of $5\mu$ or less, 3 percent by weight of graphite powder having an average particle diameter of $5\mu$ or less, and 6~9 percent by weight of porous carbon powder having an average particle diameter of $30\mu$ or less.

5. A sliding member according to claim 4, wherein the sliding member is a ring having a double step gap.

* * * * *